US010028430B2

United States Patent
Henry et al.

(10) Patent No.: US 10,028,430 B2
(45) Date of Patent: Jul. 24, 2018

(54) METHOD OF CALIBRATING AN APPLICATOR

(71) Applicant: CNH Industrial Canada, Ltd., Saskatoon (CA)

(72) Inventors: James W. Henry, Saskatoon (CA); Mohammad Vakil, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 0 days.

(21) Appl. No.: 15/273,099

(22) Filed: Sep. 22, 2016

(65) Prior Publication Data

US 2017/0006770 A1    Jan. 12, 2017

Related U.S. Application Data

(62) Division of application No. 13/675,258, filed on Nov. 13, 2012, now Pat. No. 9,468,940.

(51) Int. Cl.
| | | |
|---|---|---|
| *A01C 23/02* | (2006.01) | |
| *A01C 23/04* | (2006.01) | |
| *A01C 23/00* | (2006.01) | |
| *B05B 1/30* | (2006.01) | |

(52) U.S. Cl.
CPC .......... *A01C 23/007* (2013.01); *A01C 23/024* (2013.01); *A01C 23/047* (2013.01); *B05B 1/3046* (2013.01)

(58) Field of Classification Search
CPC ..... A01C 23/024; A01C 23/023; A01C 23/02; A01C 23/00; A01C 23/047; A01C 23/04; A01C 23/007; B05B 1/3046; B05B 1/304; B05B 1/3033; B05B 1/30; B05B 1/00

USPC ........... 111/200, 900, 118, 119, 129; 701/50
See application file for complete search history.

(56) References Cited

U.S. PATENT DOCUMENTS

| | | |
|---|---|---|
| 4,590,768 A | 5/1986 | Halvorsen et al. |
| 4,824,827 A | 6/1989 | Graf et al. |
| 4,842,627 A | 6/1989 | Graf et al. |
| 7,096,744 B2 | 8/2006 | Kielb et al. |
| 7,379,832 B2 | 5/2008 | Zimmermann et al. |
| 7,640,078 B2 | 12/2009 | Smirnov |
| 7,824,638 B2 | 11/2010 | Kramer et al. |
| 7,979,165 B2 | 7/2011 | Gotoh et al. |
| 8,037,894 B1 | 10/2011 | Kelekar et al. |
| 8,667,916 B1 | 3/2014 | Kiest |
| 2003/0094196 A1 | 5/2003 | Siefering |

(Continued)

OTHER PUBLICATIONS

ANH3.Company commits to Advancing Cover Crop usage: Partners in Agriculture—Illinois Agrinew, p. 16; Aug. 3, 2012.

*Primary Examiner* — Christopher J. Novosad
(74) *Attorney, Agent, or Firm* — Rebecca L. Henkel; Rickard K. DeMille

(57) ABSTRACT

An ammonia applicator system includes has adjustable orifices with openings having variable sizes that can be changed remotely, without having to disassemble exit lines from a distribution manifold. In this way, the restriction of the exit lines and, thus, line flow rate can be adjusted remotely and/or automatically, even during ammonia application use. Each adjustable orifice may include a valve and an actuator that controls the valve for changing the size of the opening of the adjustable orifice. The actuator may be a rotary actuator, such as a stepper motor, and the valve may include an adjustment knob and a screw that can rotate to allow a needle to advance or regress through an opening of a valve body of the valve.

8 Claims, 5 Drawing Sheets

(56) References Cited

U.S. PATENT DOCUMENTS

2010/0286931 A1 11/2010 Mendelson
2011/0155935 A1 6/2011 Morkhoit

METHOD OF CALIBRATING AN APPLICATOR

CROSS-REFERENCE TO RELATED APPLICATION

The present application is a divisional of application Ser. No. 13/675,258 filed Nov. 13, 2012.

FIELD OF THE INVENTION

The invention relates generally to fertilizer applicators and, in particular, to ammonia applicators.

BACKGROUND OF THE INVENTION

Anhydrous ammonia is commonly used as an agricultural fertilizer for supplying nitrogen to agricultural fields. It is often preferable to apply nitrogen as a liquid, free of vapor, to the agricultural fields. Maintaining ammonia as a vapor free liquid while conveying the ammonia through the ammonia applicator system helps in even distribution of the ammonia into the distribution line and onto the agricultural field. One way of maintaining ammonia in a liquid state is to pressurize the ammonia using a pump. Orifice plates are arranged at exit ports of distribution manifolds which create line restrictions and thus necessitate pressure increase, by pump, for a given flow rate. The amount of line restriction can be varied by changing the orifice plates to ones that have openings of different sizes for providing different line restrictions and therefore different flow rates.

SUMMARY OF THE INVENTION

The present invention is directed to an ammonia applicator system that helps ensure delivery of liquid ammonia to a manifold(s) of the ammonia applicator system by way of adjustable orifices; that is orifices with openings of variable sizes. These openings can be changed remotely, without having to disassemble the exit lines from the manifold. In this way, the restriction of the exit lines and, thus, line flow rate can be adjusted remotely and/or automatically, even during ammonia application use.

According to a first aspect of the invention, an ammonia applicator system for fertilizing an agricultural field is provided and includes a tank that can hold ammonia, a manifold that receives ammonia from the tank for distributing the ammonia onto the agricultural field, and multiple exit lines that extend from the manifold and through which ammonia can be directed onto the agricultural field. Multiple adjustable orifices may be arranged downstream of the manifold so that an adjustable orifice is provided in a flow path of each of the exit lines for controlling the flow characteristic of the ammonia that is directed through the exit lines. Each of the adjustable orifices may include an opening that can change size between a minimum opening size, which can be completely closed, and a maximum opening size so as to control the flow characteristic of the ammonia that is directed through the exit line. Each adjustable orifice may be arranged between an outlet port of the manifold and a respective exit line. Each adjustable orifice may include a valve that can move for changing the size of an opening of the adjustable orifice and an actuator that is arranged to move the valve so as to change the size of the opening of the adjustable orifice. The valve may include a screw and an adjustment knob that can rotate to advance or regress the screw so as to change the size of the opening of the adjustable orifice. The actuator may be a rotary actuator that is arranged to rotate the adjustment knob of the valve. This may allow for varying line restriction and thus varying the corresponding flow characteristic of the ammonia, even during use, without having to manually change orifice plates at the manifold.

According to another aspect of the invention, a pair of pressure sensors may be provided adjacent to each of the adjustable orifices. In this way a first pressure sensor may be arranged upstream of each of the adjustable orifices and a second pressure sensor may be arranged downstream of each of the adjustable orifices. This may allow for individual calibration and/or control of each of the adjustable orifices for establishing target or calibrated flow rates through each of the exit lines.

According to another aspect of the invention, a method is provided for using an ammonia applicator for fertilizing an agricultural field. The method may include directing ammonia from a pressurized tank along a delivery path that extends through a manifold and multiple exit lines that extend from the manifold and are arranged for delivering ammonia onto an agricultural field, adjusting a pump pressure to maintain a target flow characteristic of the ammonia and changing the size of an opening of an adjustable orifice for controlling a flow characteristic of the ammonia that is directed through a respective one of the multiple exit lines so as to maintain a target manifold pressure while the target flow rate of ammonia is maintained. This may allow for automatic control of flow rates and line pressures in the lines which may help maintaining the ammonia in a liquid state for liquid delivery onto the agricultural field.

According to another aspect of the invention, a rate of application of the ammonia to the agricultural field may be varied during a single fertilizing session in which the ammonia is applied to the agricultural field. An adjustable orifice at each of the multiple exit lines may be controlled so as to maintain a target flow characteristic of the ammonia through each of the multiple exit lines. The target flow characteristic, which may be flow rate of at least one of the multiple exit lines, is different from another one of the multiple exit lines. The multiple valves may be controlled in a manner that provides different ammonia delivery rates for the different multiple exit lines so as to achieve point row control in which the flow of ammonia to individual ground engaging tools, at which the multiple exit lines deliver the ammonia to the agricultural field, is separately controlled. This may allow for a highly controllable system for applying different amounts of the ammonia to different parts of the field with different fertilizing requirements which may reduce the amount of excess product applied to portions of the agricultural field, and may prevent product overlap in application.

According to another aspect of the invention, a method of calibrating an ammonia applicator for use in fertilizing an agricultural field is provided. The method may include determining a calibrated position of each of multiple valves. The calibrated positions of the valves may correspond to calibrated flow characteristics of ammonia flowing through the respective exit lines such as maximum liquid flow rates or target flow rates.

According to another aspect of the invention, a first pressure value may be determined upstream of each of multiple adjustable orifices and a second pressure value may be determined downstream of each of the multiple orifices. A position of each of the multiple valves may be adjusted to determine a position at which an initial pressure drop is established across the respective adjustable orifice, which may correspond to a maximum flow rate. One of the exit lines may be used as a base-value exit line to set for calibrating the other exit lines by adjusting the adjustable orifices in the other exit lines. A first flow characteristic in the base-value exit line may be determined and the valve in another one of exit lines may be adjusted so as to achieve the first flow characteristic base-value exit line in the other exit line(s). The first flow characteristic may be a pressure related value that corresponds to a flow rate value, such as a required manifold pressure and a line flow rate. A fixed orifice that has an opening of a known fixed size may be arranged in a flow path that extends through a first one of the exit lines so as to define a first flow characteristic at a first one of the exit lines and positions of the valves may be adjusted to achieve the first flow characteristic in the other exit lines. The fixed orifice may establish a maximum flow rate at the first exit line and the other valves may be adjusted to achieve the maximum flow rate of the first exit line. Each of valves may include an adjustment knob that is turned by a rotary actuator for calibration and the angular position of the adjustment knob at the calibrated position may be stored in memory of a controller that controls the system. This may allow for calibration of an adjustable orifice on an ammonia applicator which allows automatic and/or remote adjustment of flow rate while accommodating differences in performance and/or manufacturing tolerances of valves or other hardware or components that may be within the system.

According to another aspect of the invention, calibration may be done by installing a fixed orifice in one of the exit lines that also has an adjustable orifice. The adjustable orifice in the exit line that also has the fixed orifice may be completely backed off so that initially only the fixed orifice provides a restriction in that exit line. The adjustable orifices in the other exit lines may be calibrated to the value of the exit line having the fixed orifice. Once the adjustable orifices in the other exit lines have been calibrated to match that of the fixed orifice, the adjustable orifices in the other exit lines may be adjusted slightly smaller. Then the adjustable orifice in the exit line that also has the fixed orifice is adjusted so that all of the exit lines have the same flow rate.

According to another aspect of the invention, during use, all of the adjustable orifices are completely opened so that the openings of the adjustable orifices define their maximum sizes which correspond to minimum restriction values in the exit lines. A control valve that controls the flow rate of the ammonia is adjusted to a first angle and the flow rate of the ammonia is measured. The measured flow rate is compared to a target flow rate. If the measured flow rate is not at the target flow rate, then a pump pressure or/and the angle of the control valve is adjusted and the flow rate is measured again. When the measured flow rate is at the target flow rate, then the pressure within the manifold is measured using a pressure sensor. If the manifold pressure is greater than the tank pressure of the tank that holds the anhydrous ammonia, then the control valve and the adjustable orifices are maintained at their current positions. Otherwise, if the manifold pressure is less than the tank pressure, then the adjustable orifices are adjusted so that their respective openings are made smaller and pump pressure increases, which increases the pressure in the manifold. This is done until the manifold pressure become equal or exceeds the tank pressure. This may allow for maintaining a target flow rate and target manifold pressure which may help maintain the ammonia in a vapor-free liquid state during application.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
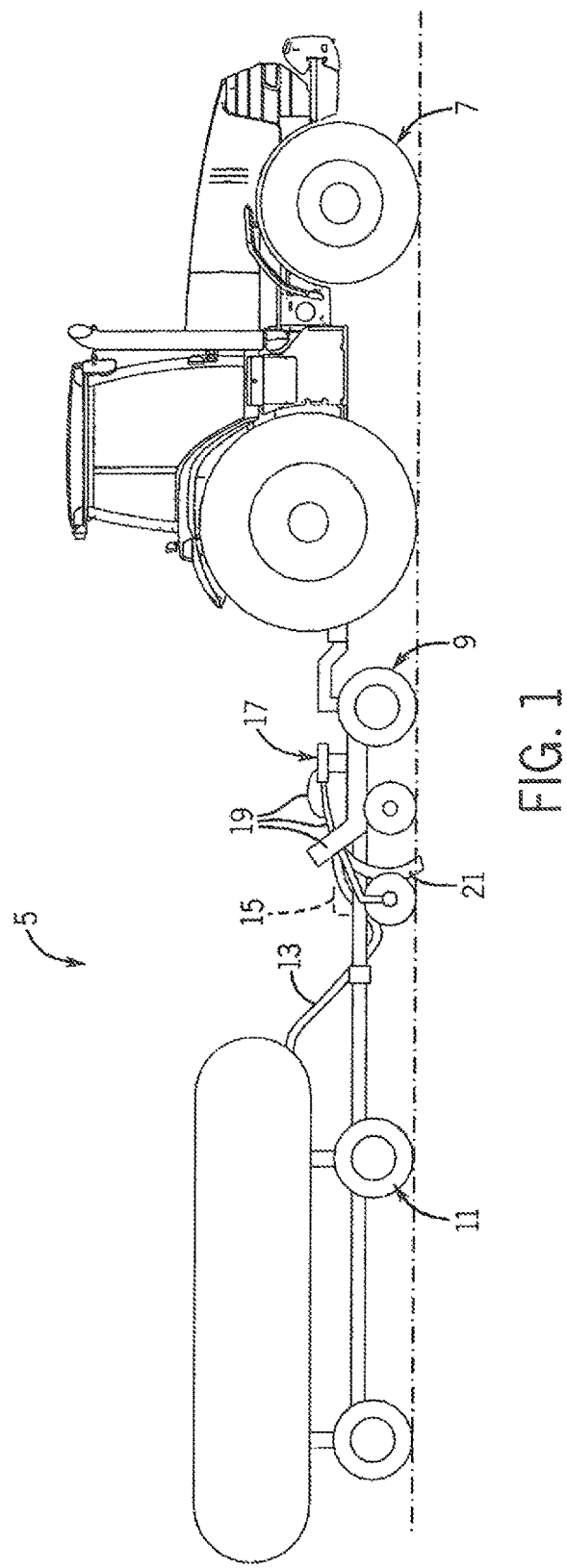
FIG. 1 is a simplified partially schematic side elevation of an ammonia applicator system in accordance with the present invention.

Referring now to the drawings and specifically to FIG. 1, an ammonia applicator system 5 is shown that is towed behind a tractor 7. The ammonia applicator system 5 includes a fertilizer applicator 9 that is connected to a drawbar of the tractor 7. The fertilizer applicator 9 may be one of the Case IH—Nutri-Placer series of fertilizer applicators available from CNH America LLC. A tank 11 is towed behind the fertilizer applicator 9 and holds liquid ammonia. A main line 13 connects the tank 11 to a pump 15 that pressurizes and delivers the ammonia to manifolds 17, only one of which is shown. Each manifold 17 delivers the ammonia through multiple exit lines 19 for delivery on to the agricultural field at ground engaging tools 21 of the fertilizer applicator 9.

Figure 2:
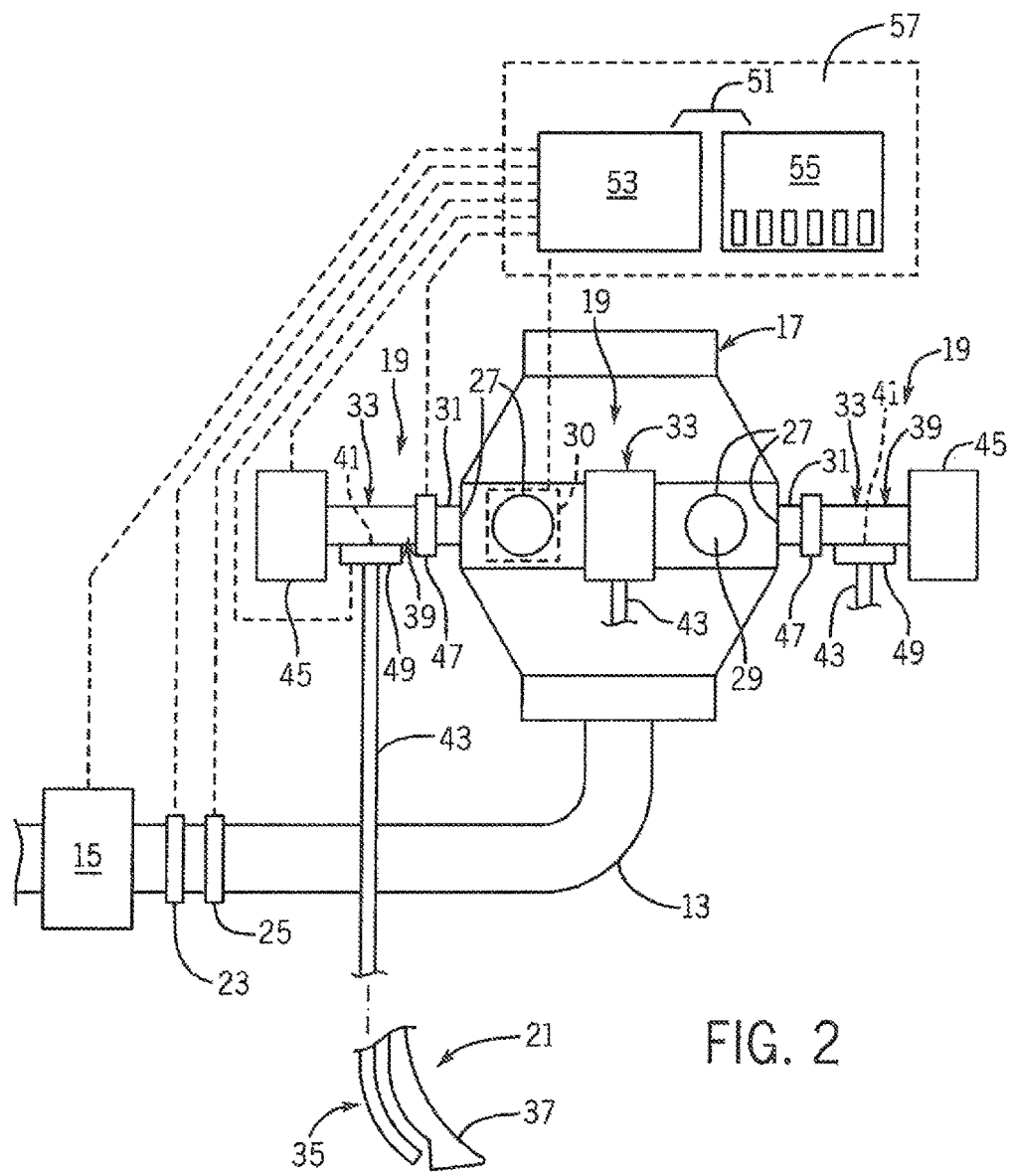
FIG. 2 is a simplified partially schematic side elevation of a portion of the ammonia applicator system shown in FIG. 1.

Referring now to FIG. 2, a main line valve 23 and a main line flow sensor 25 are arranged in the main line 13 for monitoring and adjusting delivery rate of the ammonia to the manifold 17. The manifold 17 receives the ammonia from the mainline 13 and delivers the ammonia out of the manifold 17 along separate flow paths 18 (FIG. 3) to begin at outlets 27 of the manifold 17. Unused outlets 27 may be capped with plugs 29. A sensor 30 may be arranged at one of the unused outlets 27 for measuring the pressure inside the manifold 17. It is understood that the sensor 30 need not be a sensor, per se, but may instead be a gauge that can be read by a user. The outlets 27 that are being used are connected to exit lines 19 that extend from the manifold to the ground engaging tools 21. Each exit line 19 includes an inlet 31 that is connected to the respective output 27 of the manifold 17. An adjustable orifice 33 is arranged between the exit line inlet 31 and an outlet end 35 of the exit line 19. The outlet end 35 of exit line 31 is shown in an arrangement that allows for delivery of ammonia underground behind a knife 37 of the ground engaging tool 21.

Still referring to FIG. 2, the adjustable orifice 33 includes a valve 39 (FIG. 3) that has an opening 41 which can change sizes and that connects to a delivery tube 43 that extends from the valve 39 to the ground engaging tool 21. An actuator 45 is operably connected to the valve 39 for controlling the size of the opening 41. The first sensor 47 is arranged in a first location along the flow path 18 (FIG. 3) of ammonia through the exit line 31. The sensor 47 is arranged between the manifold 17 and the valve 39 of the adjustable orifice 33 so that the sensor 47 is upstream of the adjustable orifice 33, Although the sensor 47 is shown schematically as being downstream of the manifold 17. it is understood that the sensor 47 may be a known sensor at the manifold 17 itself, whereby separate sensors 47 need not be implemented at each of the exit lines 19 in some embodiments. A second sensor 49 is arranged in a second location along the flow path 18 (FIG. 3) of ammonia through the exit line 19. The sensor 49 is arranged between the valve 39 and the delivery tube 43 so that the sensor 49 is downstream of the adjustable orifice 33. In this way, the pair of sensors 47, 49 are arranged on opposing sides of the adjustable orifice 33. In one embodiment, the sensors 47, 49 are pressure sensors that can sense pressure related flow characteristics of the ammonia flowing along the flow path 18 (FIG. 3) through the exit line 19.

Still referring to FIG. 2, each of the pump 15, the main line valve 23, main line flow sensor 25, manifold pressure sensor 30, actuator 45, and sensors 47, 49 are operably connected to a control system 51. Control system 51 is configured to remotely and/or automatically adjust line restrictions and therefore line flow rates and pressures of the exit lines 19 collectively and/or individually, even while ammonia is being dispensed. Outlet tubes 31 are connected to the outlets 27 that are being used and connect the outlets 27 to adjustable orifices 33. Control system 51 is shown as having a controller 53 that can include an industrial computer or, e.g., a programmable logic controller (PLC), along with corresponding software and suitable hardware for controlling electronic or electro mechanical components of the ammonia applicator system 5. A user console 55 is operably connected to the controller 53 and includes a user interface such as indicator lights, a display, buttons, switches, and/or levers that can be manipulated by the operator to control operation of the ammonia applicator system 5 remotely, and monitor system performance and conditions of system components, from within the cab 57 of the tractor 7 (FIG. 1).

Figure 3:
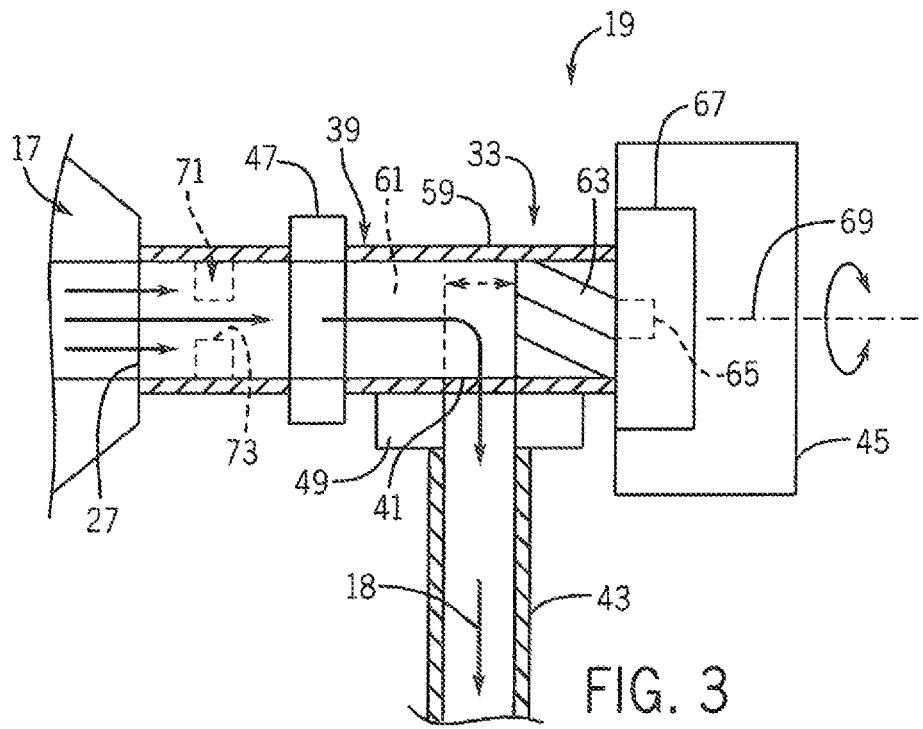
FIG. 3 is a simplified partially schematic cross-sectional view of portions of an exit line of the ammonia applicator system shown in FIG. 1.

Referring now to FIG. 3, each valve 39 includes a valve body 59 that has a longitudinally extending opening 61. The opening 41 extends through the valve body 59 to transversely intersect the opening 61. A needle 63 is arranged for movement inside of the opening 61. A screw 65 is operably connected to the needle 63 so that rotation of the screw 65 axially advances or regresses the screw 65 within the opening 61 based on the direction of rotation. A knob 67 is arranged at an end of the screw 65 and is locked into rotational unison with the screw 65. In this way, rotation of the knob 67 about an axis of rotation 69 rotates the screw 65 which advances or regresses the needle 63 along the opening 61. In this embodiment, the actuator 45 is a rotary actuator which may include a stepper motor that is controlled by the control system 51. It is understood that the actuator 45 may be another type of actuator, such as a linear actuator, depending on the particular configuration of the valve 39.

Still referring to FIG. 3, the needle 63 can include a plunger-type body that occupies substantially all of the opening 61 so that moving the needle 63 through the opening 61 covers or uncovers and therefore varies the size and restriction through the opening 41. In this way, flow characteristics of ammonia, such as pressure and velocity or flow rate, flowing to the delivery tube 43 can be adjusted. The needle 63 shown in solid line form in FIG. 3 is in a first position that represents a fully backed off position in which the valve 39 provides no restriction through the opening 41. Rotating the knob 67 can axially advance the needle 63 to a second position that is represented by a dashed line that extends through the opening 61 and generally aligns with a left edge of the opening 41. When the needle 63 is in the second position, flow of ammonia through opening 41 is fully restricted because the opening 41 is entirely blocked by the needle 63. Rotating the knob 67 between the angular positions defined at the first and second positions of the needle 63 allow the size of the opening 41 to be adjusted between its fully unrestricted and fully restricted arrangements. Needle 63 may be infinitely adjustable between the fully unrestricted in the fully restricted positions. One suitable needle-type valve is model NFCC-KCN available from the Sun Hydraulics Corporation.

Still referring to FIG. 3, the exit line 19 may also include a fixed orifice 71. The fixed orifice 71 is arranged upstream of the adjustable orifice 33. The fixed orifice 71 includes an opening 73 that is of a predetermined fixed size, as is known. When the fixed orifice 71 is implemented, the line restriction through exit line 19 has a minimum value that is established by the fixed orifice 71. In this way, when the needle 63 is fully backed off so that the opening 41 is unrestricted, the exit line 19 is still restricted by the fixed orifice 71.

Figure 4:
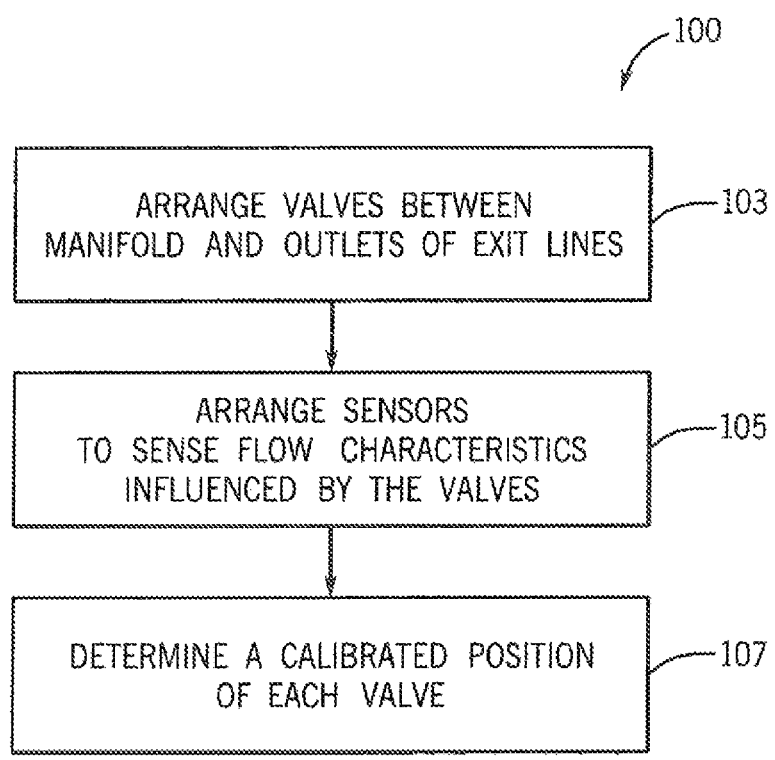
FIG. 4 is a flowchart of a first calibration procedure.

Referring now to FIGS. 3 and 4, the ammonia applicator system 5 may be generally calibrated in the following way, as represented by procedure 100 of FIG. 4 and the components of FIG. 3. As shown at block 103, the sensors 47, 49 may be arranged within the exit lines 19. As represented at block 105, the flow sensor 25 may be used to measure flow rate and the sensors 47, 49 may be used to determine pressure values within the adjustable orifice 33 at that particular sensed flow rate so that the control system 51 receives or determines measured pressure and corresponding measured flow rate values. A calibration position may be defined for each of the valves 39 as shown at block 107. This may be done by establishing a target which may be a baseline flow characteristic through the adjustable orifice 33 in determining the position of the needle 63 at the angular position of the screw 65 or knob 67 that corresponds to such flaw characteristic. The determined value may then be saved in the control system 51.

Still referring to FIGS. 3 and 4, in one embodiment, the target value that represents a baseline flow characteristic may correspond to an initial pressure drop across the valve 39. To establish the initial pressure drop across the valve 39, each adjustable orifice 33 is adjusted from a fully backed off position of the needle 63 while monitoring pressure values that are sensed by the sensors 47 and 49. The adjustable orifice 33 is adjusted by rotating the adjustment knob 67 to move the needle 63 from its fully backed off position so as to travel across the opening 41 until a pressure drop in the sensor 47 is observed. The angular position of the adjustment knob 67 when the initial pressure drop occurs across the valve 39 is stored by the control system 51. This position represents a limit of the adjustable range of travel of the adjustment knob 67 and needle 63 of the maximum flow rate through the adjustable orifice 33 so that turning the adjustment knob 67 and moving the needle 63 relatively further across the opening 41 from this position will provide a lower flow rate through the exit line 19 and more line restriction through the exit line 19. This may also represent a target flow rate that can be referenced by the control system 51 so that the control system 51 can return each of the adjustable orifices 33 to that position to provide the corresponding flow rate. Such calibration may be done in each of the adjustable orifices 33 with the fixed orifice 71 arranged in one of the exit lines 19, optionally with fixed orifices 71 arranged in more than one but fewer than all of the exit lines 19, or in each of the exit lines 19, whereby each adjustable orifice 33 is individually calibrated to determine the position of the adjustment knob 67 that represents the maximum flow rate position as defined by the fixed orifice 71 in the particular exit line 19.

Figure 5:
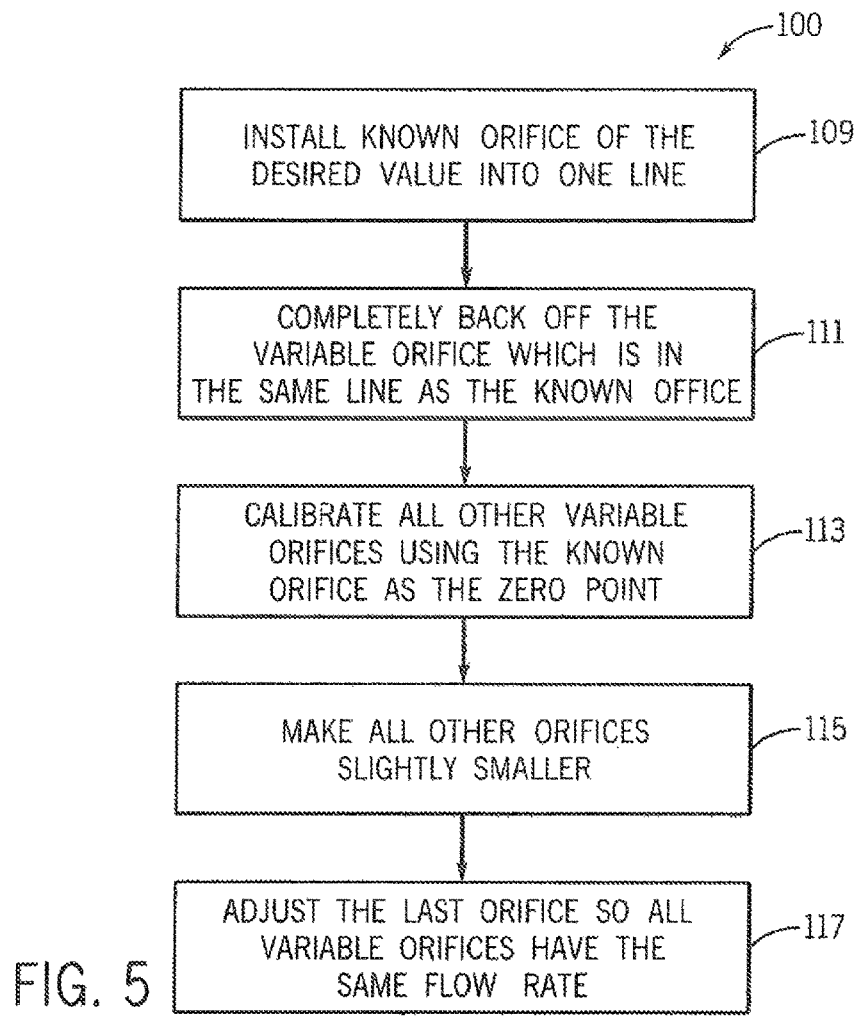
FIG. 5 is a flowchart of a variant of the calibration procedure of FIG. 4.

Referring now to FIGS. 3 and 5, in this embodiment, only one fixed orifice 71 is used in the one of the exit lines 19 to calibrate the maximum flow rate position of the adjustment knob 67 for that exit line 19 as a base-value exit line 19. The other exit lines 19 are calibrated to that base value exit line 19. At blocks 109 and 111, the fixed orifice 71 is installed in the base value exit line 19 and the needle 63 is completely backed off in the adjustable orifice 33 of the base value exit line 19. Pressure readings are taken as sensed by the sensors 47 and 49 in the base value exit line 19 with the needle 63 completely backed off. For a given driving pressure upstream of the adjustable orifice 33, when the needle 63 is completely backed off, the pressure differential across the sensors 47 and 49 represents the maximum flow rate for that particular upstream driving pressure and for that particular fixed orifice 71 size, against which the other exit lines 19 are calibrated as represented by block 113. At block 115, the other adjustable orifices 63 are then adjusted to make their respective openings 41 slightly smaller so as to reduce the flow rate and increase the line restriction in these other exit lines 19 to some extent while making the flow rates of these other exit lines 19 the same as each other. The adjustable orifice 33 of the base value exit line 19 is then adjusted to match the flow rates of all of the exit lines 19, which is represented by block 117. At this point, the angular positions of the adjustment knobs 67 can be stored by the control system 51 to correspond to a target flow rate value. The target flow rate value may be at or near a maximum flow rate of the adjustable orifices 33 so that further movement of the needles 63 away from the fully backed off positions and further across the openings 41 may increase line restriction and decrease flow rates.

Figure 6:
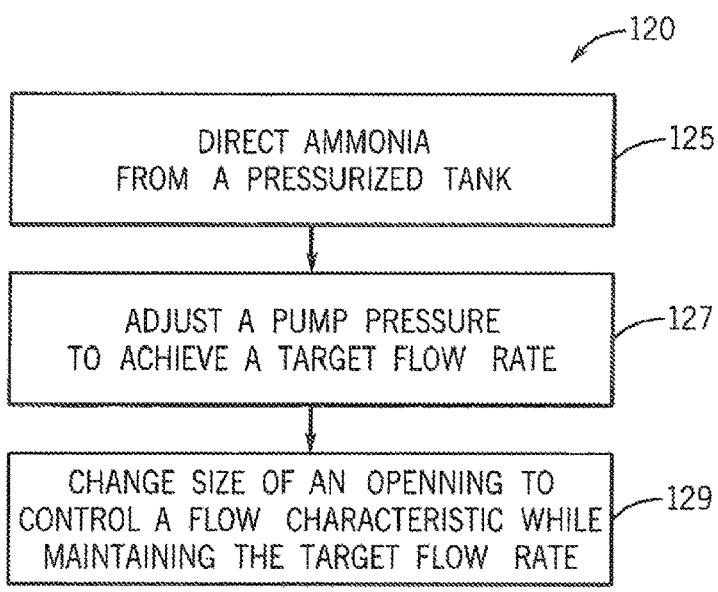
FIG. 6 is a flowchart of a first use procedure.

Referring now to FIGS. 2, 3, and 6, the ammonia applicator system 5 may be generally used in the following way, as represented by procedure 120 of FIG. 6 and the components of FIGS. 2 and 3. As represented by block 125 of FIG. 6, ammonia is directed from the tank 11 (FIG. 1) toward the manifold 17. As represented by block 127, the pump 15 and the main line valve 23 are controlled by the control system 51 to provide a desired flow rate of the ammonia as sensed by sensor 25. Block 129 represents changing the size of the openings 41 of the adjustable orifices 33 to control the flow characteristic of the ammonia that is flowing through the exit lines 19. This may include providing enough line restriction to maintain at least some back pressure in the exit lines 19 while noting that by increasing line restriction, if the flow rate is kept constant, then the back pressure increases.

Figure 7:
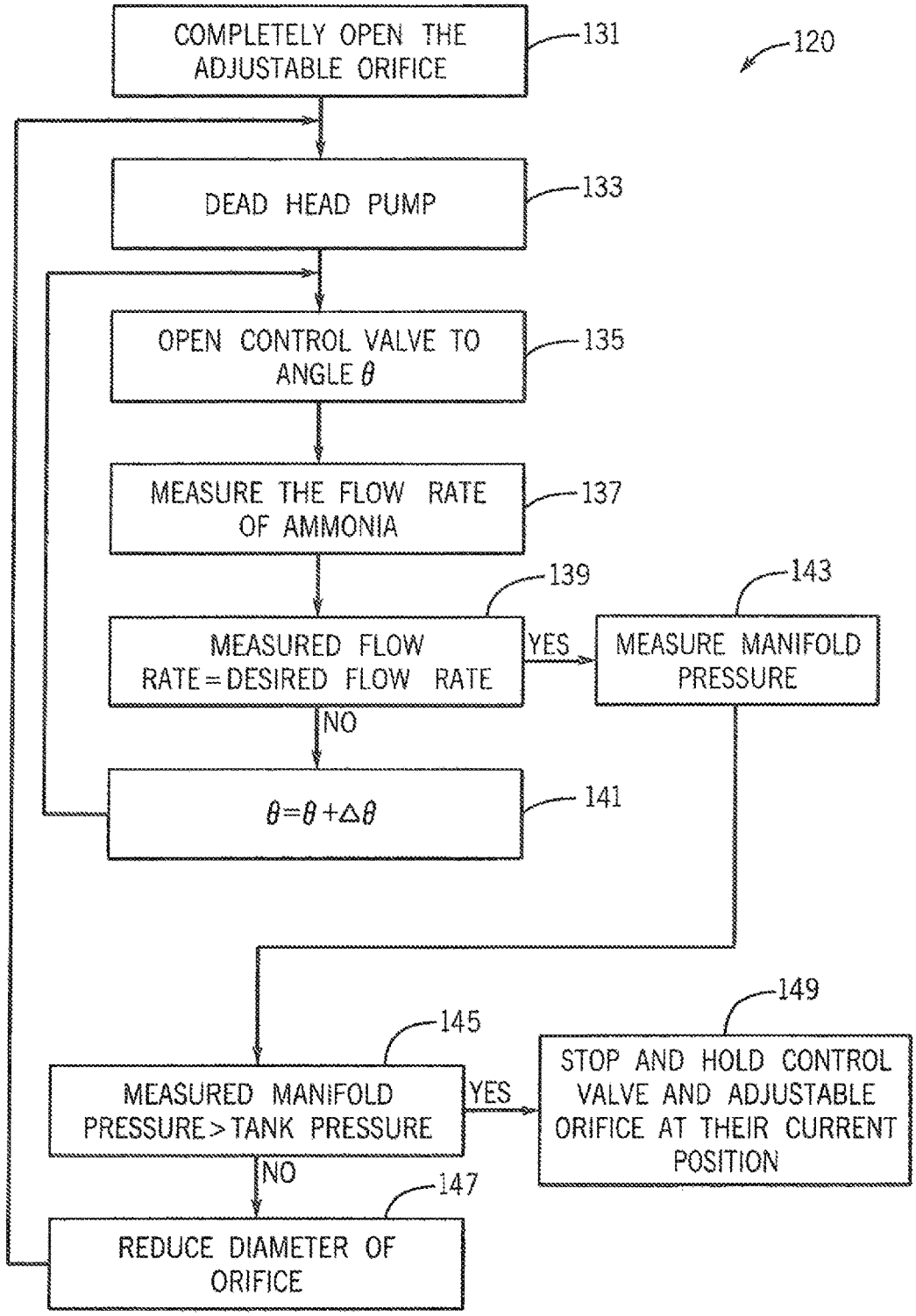
FIG. 7 is a flowchart of an algorithm for use with a variant of the use procedure of FIG. 6.

Another, more detailed, use procedure 120 is represented in FIG. 7 with reference to the components of FIGS. 2 and 3. In this embodiment the adjustable orifices 33 are completely opened by fully backing out the needles 63 to fully expose the openings 41, and the pump 15 is deactivated to provide no head pressure, shown as blocks 131 and 133. The pump 15 is activated and the main line valve 23 is opened, as a control valve, to a predetermined angle that may be stored by the control system 51 or determined by the operator as a starting position, and the flow of ammonia is measured by the main line flow sensor 25, as shown at blocks 135 and 137. At block 139, the measured flow rate of ammonia is compared to a desired flow rate by the control system 51 or by the operator. If the measured flow rate is not the desired flow rate, then the control valve such as main line valve 23 is adjusted until the desired flow rate is achieved, represented by block 141. At block 143, the manifold pressure is measured at the manifold pressure sensor 30. The manifold pressure value is compared to the tank pressure value of the tank 11 (FIG. 1). If the manifold pressure value is not equal or greater than the tank pressure value, then the adjustable orifices 33 are adjusted to decrease the size of the opening 41 to increase the line restriction of the exit lines 19 and to increase the back pressure of the manifold 17 as represented by blocks 145 and 147. When the manifold pressure is greater than the tank pressure, then the control system 51 holds the main line valve 23 and the adjustable orifices 33 in their current positions. In this way the control system 51 is able to automatically control the adjustable orifices 33 and the pump 15 to maintain a desired flow rate while maintaining a desired manifold pressure. It is understood that the control system 51 need not control the adjustable orifices 33 at the same time or at the same rates. Instead, the control system 51 may individually control the adjustable orifices 33 to provide different ammonia delivery rates from different portions of the fertilizer applicator 9 (FIG. 1). This may be done so as to achieve point row control in which the flow of ammonia for delivery at the individual ground engaging tools 21 is separately controlled. During point row control and/or other procedures, at least one of the adjustable orifices 33 may be completely closed to prevent delivery of ammonia through the respective exit line(s) 19.

Many changes and modifications could be made to the invention without departing from the spirit thereof. The scope of these changes will become apparent from the appended claims.

We claim:

1. A method of calibrating an ammonia applicator for use in fertilizing an agricultural field, comprising:

directing ammonia from a pressurized tank along a delivery path that extends through a manifold and multiple exit lines that extend from the manifold and are arranged for delivering ammonia onto an agricultural field;

arranging multiple valves within the multiple exit lines downstream of the manifold so that each of the multiple valves can be adjusted to influence a flow characteristic of the respective exit line;

arranging multiple sensors with respect to the multiple valves so that the multiple sensors can sense characteristics that correspond to the flow characteristics that are influenced by the multiple valves; and determining a calibrated position of each of the multiple valves to correspond to a target flow characteristic of ammonia flowing through the respective exit line.

2. The method of claim 1 further comprising controlling each valve to change a size of an opening of a respective adjustable orifice and determining a first pressure value upstream of each of multiple orifices and determining a second pressure value downstream of each of the multiple orifices.

3. The method of claim 1 further comprising determining a first flow characteristic in a first one of exit lines and adjusting the valve in a second one of exit lines so as to achieve the first flow characteristic in the second one of the exit lines.

4. A method of calibrating an ammonia applicator for use in fertilizing an agricultural field, comprising:
   arranging multiple valves within multiple exit lines that distribute ammonia for delivery to an agricultural field so that each of the multiple valves can be adjusted to influence a flow characteristic of the respective exit line;
   arranging multiple sensors with respect to the multiple valves so that the multiple sensors can sense characteristics that correspond to the flow characteristics that are influenced by the multiple valves;
   determining a calibrated position of each of the multiple valves to correspond to a target flow characteristic of ammonia flowing through the respective exit line; and
   arranging a fixed orifice that has an opening of a known fixed size in a flow path that extends through a first one of the exit lines so as to define a flow rate through the first one of the exit lines and adjusting at least one of the valves based on the first flow rate.

5. The method of claim 4 wherein the fixed orifice establishes a maximum flow rate, and valves are adjusted so as to achieve the maximum flow rate.

6. The method of claim 5 wherein the valves are individually adjusted so as to achieve a desired flow rate.

7. The method of claim 6 wherein each of the valves includes an adjustment knob and the calibrated position of each of the multiple adjustment valves corresponds to an angular position of the respective adjustment knob.

8. A method of calibrating an ammonia applicator for use in fertilizing an agricultural field, comprising:
   arranging multiple valves within multiple exit lines that distribute ammonia for delivery to an agricultural field so that each of the multiple valves can be adjusted to influence a flow characteristic of the respective exit line;
   arranging multiple sensors with respect to the multiple valves so that the multiple sensors can sense characteristics that correspond to the flow characteristics that are influenced by the multiple valves; and
   determining a calibrated position of each of the multiple valves to correspond to a target flow characteristic of ammonia flowing through the respective exit line;
   controlling each valve to change a size of an opening of a respective adjustable orifice and determining a first pressure value upstream of each of multiple orifices and determining a second pressure value downstream of each of the multiple orifices; and
   adjusting the position of each of the multiple valves to determine a position at which an initial pressure drop is established across the respective adjustable orifice.

* * * * *